United States Patent Office
3,413,363
Patented Nov. 26, 1968

3,413,363
PROCESS USING AN IMPROVED FORM OF GUIGNET'S GREEN FLUORINE EXCHANGE CATALYST
Daniel Pindzola, Pennsville, N.J., assignor to E. I. du Pont de Nemours and Company, Wilmington, Del., a corporation of Delaware
No Drawing. Filed Mar. 2, 1966, Ser. No. 531,032
1 Claim. (Cl. 260—653.7)

ABSTRACT OF THE DISCLOSURE

Process of fluorinating aliphatic halogenated compounds by reacting them with hydrogen fluoride in the presence of an activated chromium (III) oxide catalyst which is prepared by extraction of water until the water-soluble solids content is less than 0.5% of the weight of solids.

---

This invention is directed to an improved form of Guignet's Green fluorine exchange catalyst, more particularly to such a catalyst having reduced water soluble solids content.

As is well known, Guignet's Green is a form of chromium (III) oxide prepared by fusing potassium dichromate with boric acid, then lixiviating with water. Commercial experience with the use of Guignet's Green as a catalyst indicated a considerable variation in the catalyst activity and catalyst life from commercial batch to batch of the pigment; there has been a need to stabilize commercial systems.

It is an object of this invention to provide means for eliminating or at least minimizing variations in activity of Guignet's Green catalyst. It is a further object to improve the catalytic performance of Guignet's Green as a catalyst.

These and other objects of the invention will be apparent from the following description and claims.

More specifically, the present invention is directed to the process of exchanging fluorine for other halogens by reaction of aliphatic halogen containing compounds with hydrogen fluoride at elevated temperatures over Guignet's Green catalyst wherein the improvement comprises extracting the catalyst with water prior to use until the water soluble solids constitute less than 0.5% by weight of the total solids; said water soluble solids content being determined by extraction in a Soxhlet extractor with water for 24 hours.

Guignet's Green is manufactured by nine step process which consists of (1) fusing together at 500–800° C. a mixture of one molar proportion sodium or potassium dichromate and 16 molar proportion of boric acid to form $Cr_2(B_4O_7)_3$, $Na(or\ K)_2B_4O_7$, oxygen and water, (2) cooling in air, (3) crushing, (4) hydrolysis in a leaching tank to convert $Cr_2(B_4O_7)_3$ to crude $Cr_2O_3 \cdot 2H_2O$ and boric acid, (5) contacting with an aqueous emulsion of a petroleum sulfonate surfactant, (6) filtering, (7) drying, (8) milling and (9) screening. A critical study of the effect of variations in each of these steps on catalytic activity of Guignet's Green catalyst indicated the following: (1) The time or completeness of fusion were not important. Incomplete conversion of Cr (VI) to Cr (III), if anything, gave a somewhat more active catalyst. (2) Rapid cooling in water rather than slow cooling in air is completely undesirable, an inactive catalyst is obtained. (3) Omission of the hydrolysis step gave a poor catalyst. Also, hydrolysis over extended periods or leaving the slurry in contact with the water for extended periods gave a poor catalyst. Present commercial practice appears to be the most satisfactory. (5) Treatment with the surfactant is primarily for pigment use of Guignet's Green, making the solids more readily dispersible. It produces a material of lower bulk density but only slightly less catalytic activity than untreated catalyst. (6, 7, 8 and 9.) Filtering, drying, milling and screening also appear to have no effect as particle size seems to have no effect on activity within limits.

It was soon found however that the "water soluble" content of the solid Guignet's Green has a strong effect on activity as does certain modes of activation.

Water extractables, as used herein, means materials which can be extracted from commercial Guignet's Green by treatment with boiling water. As further used herein, percent water soluble solids in the Guignet's Green catalyst means the percent by weight which is extracted from the solids with water in 24 hours in a Soxhlet extractor. It is known, particularly where the catalyst was treated with surfactant, that such treatment does not completely remove all water soluble material. Commercial lots of Guignet's Green from the same supplier vary considerably in composition. Table I below shows the composition of four typical lots.

TABLE I

| Lot | 1 | 2 | 3 | 4 |
|---|---|---|---|---|
| Component, Percent: | | | | |
| $Cr_2O_3$ | 81.3 | 78.3 | 76.5 | 75.6 |
| $B_2O_3$ | 1.89 | 4.51 | 5.09 | 4.75 |
| Na | 0.15 | 0.18 | 0.15 | |
| Combined $H_2O$ | 11.7 | 12.5 | 12.4 | 12.39 |
| Uncombined $H_2O$ | 3.98 | 3.75 | 5.29 | 4.76 |
| Water Solubles | 0.52 | 1.51 | 1.59 | 1.90 |

It is easily seen that Guignet's Green is not pure $Cr_2O_3 \cdot 2H_2O$ by any means. Water solubles in Table I represent the amounts of material extracted in six hours. Actually use of a Soxhlet extractor for ten days may remove two to four times as much water solubles.

The nature of the materials extracted by water from Guignet's Green vary, primarily with whether or not the pigment was treated or not treated with the petroleum sulfonate surfactant during manufacture. If untreated, the extractables consist primarily of boron compounds with small amounts of chromium compounds and others. If treated, boron compounds and surfactant are the major constituents.

It has now been found that extraction of commercial Guignet's Green pigment until the "water solubles" content is less than 0.5% by weight, as determined by extraction of a sample of treated pigment with boiling water in a Soxhlet extractor for 24 hours, gives the best catalyst. It is not at all certain what is removed during extraction which increases activity. As indicated earlier, surfactant does not grossly affect the catalyst if activated properly. Nor is the presence of boron compounds to blame. It has been found that in use the boron compounds are almost completely removed from the catalyst within 15 hours, long before even an unextracted catalyst loses activity. Nor are the physical characteristics of the catalyst materially changed. Measurements show that specific surface areas are altered slightly, sometimes increased, sometimes decreased by 96 hours extraction in a Soxhlet extractor while pore volume and average pore diameter are invariably decreased. The causes of changed catalytic activity cannot then be detected by available means but the changes in activity certainly can. Thus, for example, in the reaction of 1,2-dichlorotetrafluoroethane with hydrogen fluoride at 450° to 500° C., conversions were increased about 30% by extraction to further remove water soluble to the less than 0.5% level. This is further illustrated in the examples below.

The mode of activation also has an effect, particularly if a Guignet's Green which has been treated with surfactant is being used. The activation temperature may not exceed 700° C., as pointed out by Swamer et al.

herein cited, because chromium (III) oxide undergoes a crystal form change to a completely inactive material. Heating to at least 400° C. is usually desirable to obtain the most active catalyst. The heating is usually carried out under a gas stream, nitrogen being preferred. At about 150° C. the catalyst loses 6% to 7% its weight as water, apparently the $Cr_2O_3 \cdot 2H_2O$ present losing one mole of water. At about 400–450° C., the remaining water, or much of it, is lost. If air or oxygen is present and if the catalyst has been treated with surfactant, an exothermic reaction sets in at about 250–300° C. Sufficient heat is developed to carry the catalyst temperature over 700° C. if great care is not exercised. For surfactant containing catalysts, therefore, the use of air or oxygen during activation is unadvisable. Hydrogen fluoride can also be used during activation of the catalyst. There appears to be little if any difference between catalysts activated under nitrogen and those activated under hydrogen fluoride.

The improved catalysts of the present invention are easily prepared by washing commercial Guignet's Green pigment, prepared as described above, with water until the water solubles content is less than 0.5% by weight. Hot water is preferred, most preferably near the boiling point. As noted earlier, various batches of Guignet's Green pigment vary considerably in their water solubles content so the time of water washing must be adjusted accordingly. The water solubles content of the washed catalyst is determined by extraction of a weighed sample in a Soxhlet extractor with water for a minimum of 24 hours, then evaporation of the water to obtain the weight of extracted material. When the water solubles content is less than 0.5% by weight, and preferably 0.2% or less, the catalyst is dried, then activated by heating at greater than 400° C., preferably under nitrogen or hydrogen fluoride as previously indicated.

The following examples are representative to illustrate the improvement obtained in the practice of the present invention. In these examples, reaction of 1,2-dichlorotetrafluoroethane with hydrogen fluoride was used to test catalyst performance; any other fluorine exchange could have been used however.

EXAMPLE 1

Various commercial samples of Guignet's Green were evaluated as fluorine exchange catalyst before and after they had been extracted with water under several sets of conditions, dried and activated by heating to the reaction temperature, using about 4° C./minute temperature increase, under nitrogen. Feed rates were 1.0 gram of 1,2-dichlorotetrafluoroethane/gram catalyst/hour and 2.0 moles hydrogen fluoride per mole 1,2-dichlorotetrafluoroethane. Catalyst charges in each case were 55 grams. The reactor consisted of a vertically mounted one inch I.D. by 34 inch nickel pipe, electrically heated. Commercial anh. hydrogen fluoride and 1,2-dichlorofluoroethane were used. The product stream was scrubbed with aqueous caustic, dried and analyzed by means of a vapor phase chromatographic unit. Temperatures were measured at the center of the catalyst bed.

The results are given in Table I. In each case the removal of water solubles significantly increases conversions.

EXAMPLE 2

This example illustrates the commercial productivity of the catalyst of this invention compared to ordinary Guignet's Green catalyst. Guignet's Green catalyst was used in a commercial scale thermal fluorine exchange apparatus for manufacture of chloropentafluoroethane from 1,2-dichlorotetrafluoroethane and HF. Each charge of catalyst was used until conversion could no longer be maintained above a preset minimum due to catalyst deactivation, then the catalyst was replaced with fresh catalyst. Operating conditions were essentially identical to those of Example 1 at 500° C. The average productivity of at least two charges of each catalyst are shown in Table II.

In Swamer and Houk, U.S. Patent 3,258,500, and Swamer, U.S. Ser. No. 381,247, filed July 8, 1964 (a continuation-in-part of U.S. Ser. No. 213,579, filed July 31, 1962, abandoned Oct. 7, 1964) disclose that commercial Guignet's Green pigment is a useful fluorine exchange catalyst with halogenated aliphatic hydrocarbons, halogenated aliphatic ketones, halogenated aliphatic aldehydes, and halogenated aliphatic nitriles.

TABLE I

| Run | Catalyst [a] | Water solubles, percent [b] | Temp., ° C. | Percent conversion $C_2F_4Cl_2$ | Percent yield $C_2F_5Cl$ [c] | Comments |
| --- | --- | --- | --- | --- | --- | --- |
| 224 | A | 0.80 | 500 | 72–75 | 94–96 | |
| 237 / 238 | A | 0.80 | 450 | 20 | 98 | |
| 303a | A-1 | 0 | 500 | 90 | 90 | } A-24 hrs. Soxhlet. |
| 304 | A-1 | 0 | 450 | 50 | 95 | |
| 345 | B | 1.12 | 480 | 45 | 96 | |
| 346a | B-1 | 0 | 480 | 75 | 93 | B-96 hrs. Soxhlet. |
| 384 | C | 1.11 | 500 | 56 | 95 | |
| 386 | C | 1.11 | 450 | 29 | 97 | |
| 388 | C-1 | 0 | 500 | 88 | 90 | } C-24 hrs. Soxhlet. |
| 389 | C-1 | 0 | 450 | 56 | 95 | |
| 253a | D | 1.05 | 500 | 50 | 94 | |
| 341 | D-1 | 0 | 500 | 75 | 95 | D-96 hrs. Soxhlet. |
| 379a | E | 0.94 | 500 | 66 | 95 | |
| 379b | E | 0.94 | 450 | 32 | 98 | |
| 382 | E-1 | 0 | 500 | 82 | 92 | } E-24 hrs. Soxhlet. |
| 383 | E-1 | 0 | 450 | 48 | 96 | |

[a] Catalysts A, B and C were surfactant treated during manufacturing, catalyst D and E were not.
[b] As determined by 24 hrs. extraction in Soxhlet extractor.
[c] The remaining product is $C_2F_6$.

TABLE II

| Catalyst | Water solubles, percent [a] | Hours on stream average | Productivity kg. $CF_3CF_2Cl$/kg. catalyst | Number of charges |
| --- | --- | --- | --- | --- |
| F [b] | 1.2 | 149 | 89 | 8 |
| G [c] | 0.9 | 273 | 148 | 2 |
| H [c] | 0.4 | 400 | 215 | 2 |

[a] 24 hours extraction with water, Soxhlet extractor.
[b] Catalyst contains surfactants.
[c] Catalyst does not contain surfactant.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A process for fluorinating 1,2-dichlorotetrafluoroethane with hydrogen fluoride over Guignet's Green catalyst at a temperature of between 400° C. and 700° C.; said catalyst being prepared by extraction with water, prior to use, until the water-soluble solids constitute less than 0.5% by weight of the total solids as determined by extraction in a Soxhlet extractor for 24 hours; said catalyst having an activation temperature of between 400° C. and 700° C.; said 1,2-dichlorotetrafluoroethane being fed at the rate of 1 gram of 1,2-dichlorotetrafluoroethane per gram of said catalyst per hour; and said process being maintained in the presence of about two moles of hydrogen fluoride per mole of 1,2-dichlorotetrafluoroethane.

References Cited

UNITED STATES PATENTS

| 3,210,430 | 10/1965 | Knight | 260—653.7 |
| 3,258,500 | 6/1966 | Swamer et al. | 260—653.7 |

DANIEL D. HORWITZ, *Primary Examiner.*